United States Patent [19]

Nguyen et al.

[11] Patent Number: 5,052,762
[45] Date of Patent: Oct. 1, 1991

[54] MOTOR VEHICLE STORAGE COMPARTMENT

[75] Inventors: Van Hung Nguyen, Sindelfingen; Siegfried Eichler, Renningen; Jürgen Körber, Sindelfingen, all of Fed. Rep. of Germany

[73] Assignee: Daimler-Benz AG, Stuttgart, Fed. Rep. of Germany

[21] Appl. No.: 523,998

[22] Filed: May 16, 1990

[30] Foreign Application Priority Data

Jun. 2, 1989 [DE] Fed. Rep. of Germany ....... 3917962

[51] Int. Cl.$^5$ .............................................. A47B 63/02
[52] U.S. Cl. ................................................... 312/242
[58] Field of Search ........................ 312/242, 328, 326

[56] References Cited

U.S. PATENT DOCUMENTS 3,171,135 3/1965 Polichio ........................... 312/242 X
4,867,398 9/1989 Butcher et al. .................. 312/242 X Primary Examiner—Joseph Falk
Attorney, Agent, or Firm—Evenson, Wands, Edwards, Lenahan & McKeown

[57] ABSTRACT

A storage compartment for a motor vehicle and the like, comprises a receptacle having a bottom well which is lowered relative to an access opening situated at the front. The receptacle has a carrier body into which the bottom well can be detachably inserted, and upright side wall parts, formed or and extending beyond the bottom well. When upright, the side wall parts prevent the bottom well from being removed from the carrier body and can be folded in against the bottom well.

7 Claims, 1 Drawing Sheet

MOTOR VEHICLE STORAGE COMPARTMENT

BACKGROUND AND SUMMARY OF THE INVENTION

The present invention relates to a storage compartment, and, more particularly, to a storage compartment for a motor vehicle having a receptacle with a bottom well lowerable relative to an access opening situated at a front portion.

German Patent Specification 1,455,750 shows a storage compartment which is composed of a pot-shaped pressing made of hardboard. The pressing is fastened to a mask, which in turn is screwed to a facia panel. In order to increase the capacity of the storage compartment, it is customary for the bottom well to be made lower than an access opening situated at the front.

This known receptacle construction gives rise, however, to a problem that the storage compartment, which is now angular, can no longer be fitted without resistance by the boundary edges, matching the access opening, of the storage cavity provided in, for example, a motor vehicle facia panel.

An object of the present invention is, therefore, of providing a large-capacity storage compartment that can be easily inserted through an opening of a cavity which is to receive the storage compartment.

The foregoing object has been achieved in accordance with the present invention by constructing the receptacle with a carrier body into which the bottom well can be detachably inserted and with upright side wall parts extending beyond and formed on the bottom well so that, when upright, the side wall parts prevent the bottom wall from being removed from the carrier body yet can also be folded in against the bottom well.

The storage compartment in accordance with the present invention has a large capacity and nevertheless fits, without further installation measures, through an opening which is provided in the cavity receiving the receptacle (for example in a facia panel), which cavity has a height lower than the total height of the receptacle. The bottom well can be pivotally suspended by a wall part from the carrier body and can then be swivelled into the carrier body when the side wall parts have been folded in, so that the height of the receptacle for installation purposes is far smaller than its height in the installed position after the bottom well has again been lowered.

The side wall parts, when thereupon raised again, bear against the edges of the carrier body which lay above them, thus preventing the bottom well from rattling or spontaneously pivoting up into the carrier body. Furthermore, the bottom well may additionally be secured by projecting catches to the carrier body or also in the cavity fastened to the vehicle for receiving the receptacle.

A visually advantageous attachment of the folding side walls to the bottom well consists in joining them to the bottom well by means of a film hinge-like reduction of material on the outside, so that the side wall parts, viewed from the interior of the storage compartment, are joined to the bottom well by a smooth surface and can even carry an internal decoration shared with the bottom well, so that no further visual masking means are required.

BRIEF DESCRIPTION OF THE DRAWINGS

These and other objects, features and advantages of the present invention will become more apparent from the following detailed description of a presently preferred embodiment when taken in conjunction with the accompanying drawings wherein.

DETAILED DESCRIPTION OF THE DRAWINGS

Figure 1:
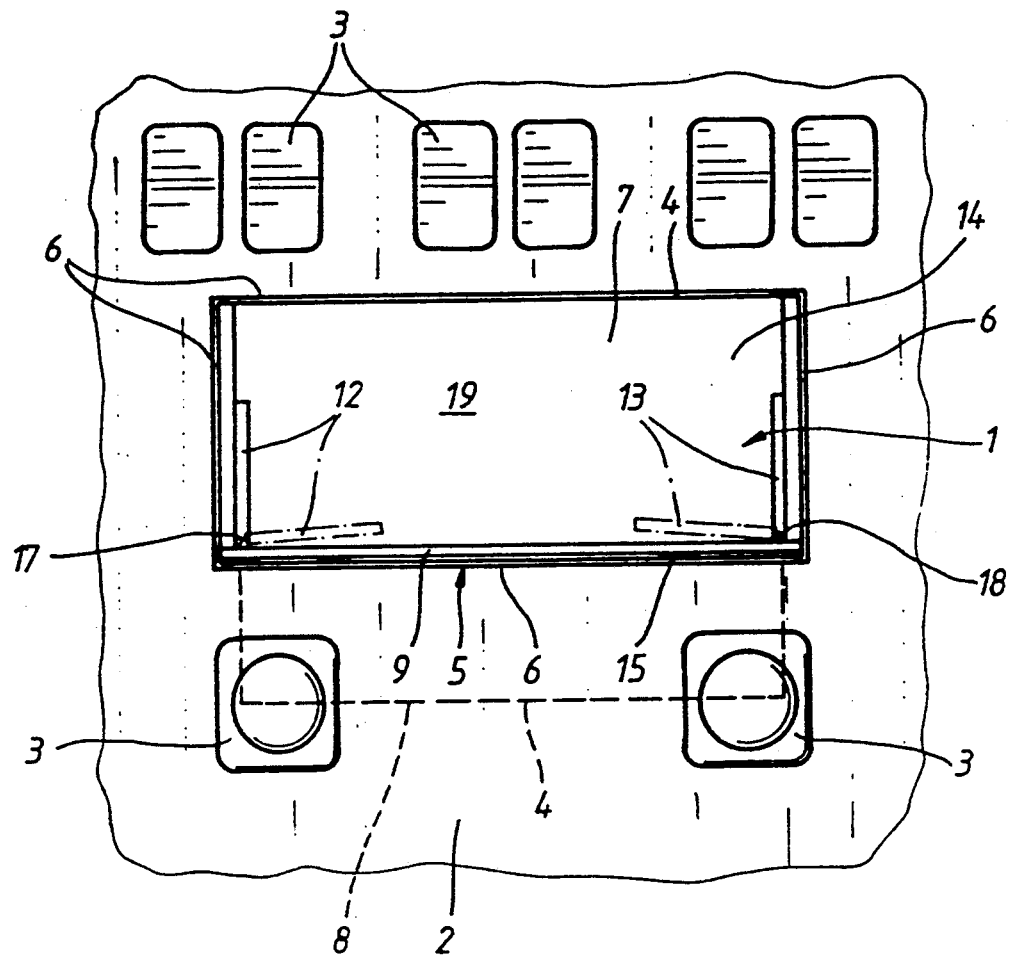
FIG. 1 is a front elevation of a storage compartment in a facia panel of a motor vehicle.
Figure 2:
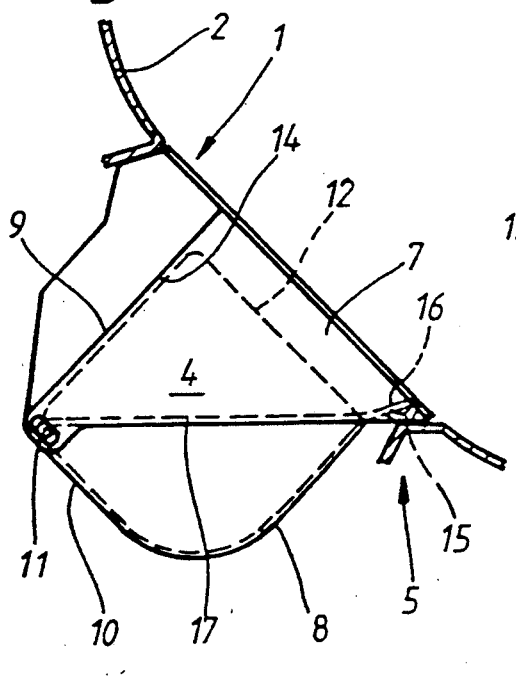
FIG. 2 is a corresponding side view of the receptacle shown in FIG. 1, in the installed position.

FIG. 1 shows a storage compartment 1 disposed in a motor vehicle facia panel 2 provided with various controls 3. For the installation of a receptacle 4 of the storage compartment 1, a cavity 5 is provided whose boundary edges 6 approximately frame an access opening 7 disposed at the front of the receptacle 4. Compared with this access opening 7, the receptacle 4 is deeper, so that it has a large capacity, as can be seen more clearly in FIG. 2.

Figure 3:
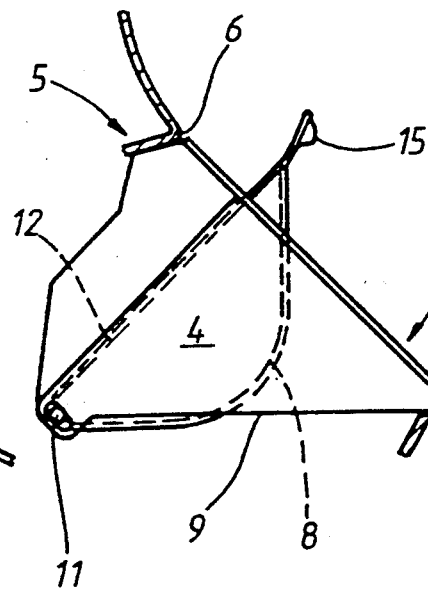
FIG. 3 shows this receptacle of FIG. 1 during its installation, with the bottom well raised.

To enable the receptacle 4 to fit through the boundary edges 6 without further installation measures, a bottom well 8 is detachably inserted into a carrier body 9 for the receptacle 4, as shown in greater detail in FIG. 3, and can be moved into the hollow interior of the carrier body 9, so that the receptacle 4 assumes for its installation a smaller height than when it is in the installed position. For this purpose, the bottom well 8 may be pivotally mounted on the carrier body 9 by a wall part 10 remote from the access opening 7, with bearing pins 11 on both sides.

In the installed position of the receptacle 4, the bottom well 8 should nevertheless form a unit with the carrier body 9, for which purpose upright side wall parts 12, 13 extend beyond and are formed on the bottom well 8. The wall parts 12, 13 when upright, lay under a correspondingly shaped edge of the carrier body 9, for example, under a receptacle roof 14, and prevent the bottom well 8 from being removed from the carrier body 9. For the purpose of installation of the receptacle 4 into the cavity 5 and for the pivoting movement of the bottom well 8 into the carrier body 9, the wall parts 12, 13 can be folded in against the bottom well.

In addition, the bottom well 8 can also be secured to the carrier body 9 by projecting catches 15 which are formed on the well 8, an which are in the illustrated embodiment, disposed on a front end edge 16 laying close to the access opening 7.

Figure 4:
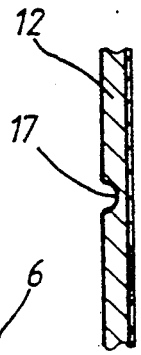
FIG. 4 shows in a partial front elevational view a transition from the bottom well to a side wall part.

In order also to obtain a visual unity of the foldable side wall parts 12, 13 with the bottom well 8, the side wall parts 12, 13 are joined to the bottom well 8 by a film hinge-like reduction of material 17, 18, respectively on the outside, as shown in detail in FIG. 4. The side wall parts 12, 13, viewed from the interior 19 of the storage compartment, are thus joined by a smooth surface to the bottom well 8 and give no hint of installation or removal of the receptacle with the side wall parts 12, 13 folded down, so that no additional masking is needed in the interior 19 of the storage compartment.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Storage compartment for a motor vehicle interior portion having an access opening, comprising a receptacle having a front portion situated at the access opening, a bottom well having side walls and being configured to be lowerable relative to the access opening, a carrier body into which the bottom well is arranged to be detachably inserted, and upright side wall parts formed on the sides of the bottom well so as to be foldable inwardly toward one another well when the bottom well is lowered relative to the access opening and then movable into an upright position thereafter so that, when in the upright position, the side walls parts prevent the bottom well from being removed from the carrier body.

2. The storage compartment according to claim 1, wherein a wall part of the bottom well remote from the access opening is fastened in relation to the carrier body.

3. The storage compartment according to claim 1, wherein projecting catches are provided for securing a front end edge of the bottom well, by close to the access opening to the carrier body.

4. The storage compartment according to claim 1, wherein a film hinge-like reduction of material on an outside surface joins the upright wall parts to the bottom well.

5. The storage compartment according to claim 2, wherein projecting catches are provided for securing a front end edge of the bottom well, by close to the access opening to the carrier body.

6. The storage compartment according to claim 2, wherein a film hinge-like reduction of material on an outside surface joins the upright wall parts to the bottom well.

7. The storage compartment according to claim 5, wherein a film hinge-like reduction of material on an outside surface join the upright wall parts to the bottom well.

* * * * *